Jan. 22, 1957  O. A. BEHLING, JR  2,778,274
MIRROR MOUNTINGS
Filed Jan. 14, 1955

INVENTOR.
Otto A. Behling, Jr.
BY Webb, Mackey & Burden
HIS ATTORNEYS

United States Patent Office 2,778,274
Patented Jan. 22, 1957

2,778,274

MIRROR MOUNTINGS

Otto A. Behling, Jr., Bridgeville, Pa.

Application January 14, 1955, Serial No. 481,838

5 Claims. (Cl. 88—93)

This invention relates to mirror mountings or brackets for motor vehicles and more particularly to mirror mountings for public transportation vehicles having multiple section folding doors.

Operators of public transportation vehicles, such as buses and trolleys, require a mirror or mirrors on the right side of their vehicles to permit them to observe passenger and pedestrian movements and traffic conditions. Preferably, the mirror should be on the outside of the vehicle near the front end to afford maximum visibility. Heretofore, public transportation vehicles either had no mirror on the right front outside or had one rigidly affixed to the right front outside corner of the vehicle where passengers entering or leaving the vehicle, or pedestrians walking alongside the vehicle at times collided with the mirror. Sometimes people who bumped into the vehicle were injured and subsequently filed damage claims. Despite injuries to individuals, many public transportation companies mounted mirrors on the right outside part of buses or trolleys to provide the operator with a good view of pedestrians, passengers and vehicles.

My invention provides an outside mirror mounting for a vehicle door of the multiple section folding type. My mounting substantially or completely withdraws a mirror affixed thereto in between two sections of the door when it is opened. When the door is closed, the mounting projects the mirror outwardly from the door, thereby affording the operator a view of traffic conditions along the right side of his vehicle. Thus, my invention materially lessens the chance of a pedestrian or passenger colliding with an outside mirror when the vehicle is standing with the door open. In addition, it automatically positions the mirror for the vehicle operator upon closing the door.

To accomplish this I employ a mounting comprising a pair of pivotal supports, each having an arm. One pivotal support is affixed to one section of a multiple section folding door and the other pivotal support is affixed to an adjacent section. The arms of the pivotal supports extend towards each other and support a substantially vertically disposed rod adapted for mounting a mirror thereupon. One of the arms is pivotally connected to this rod whereby when the door is closed a mirror positioned upon my mounting is projected outwardly from the door and whereby when the door is opened the mirror is substantially withdrawn in between the two adjacent sections of the door.

In the accompanying drawings, I have shown a preferred embodiment of my invention in which.

Figure 1:
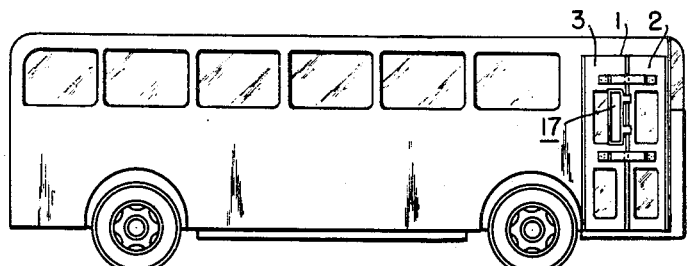
Figure 1 is a side elevation view showing my mounting affixed to a public transportation vehicle.
Figure 2:
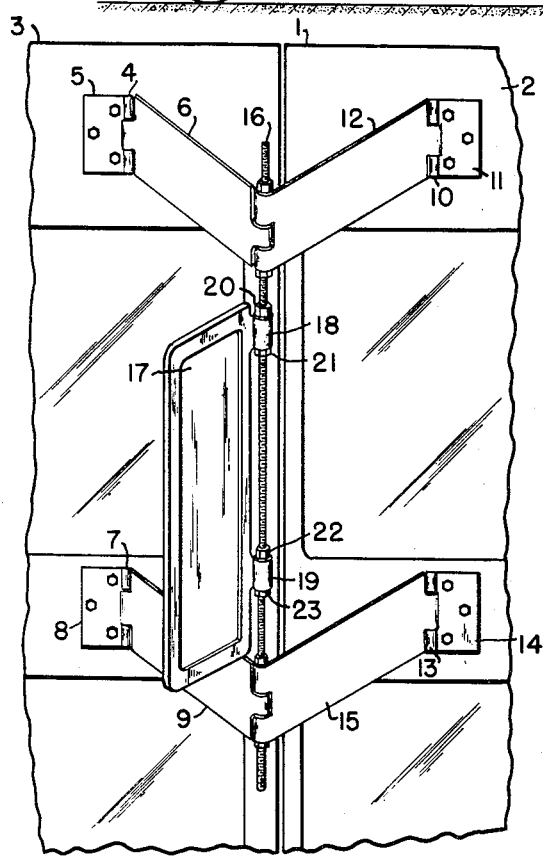
Figure 2 is a perspective view of my mounting attached to a two-section folding type vehicle door.

Figures 1 and 2 show a multiple section folding door 1 having sections 2 and 3. Attached to the door 1 is my mirror mounting which comprises two pairs of hinges. Hinge 4 of the top pair has leaf 5 affixed to section 3 and leaf 6 extending toward the adjacent door section 2. Likewise, hinge 7 of the bottom pair has leaf 8 affixed to section 3 and leaf 9 extending toward door section 2. Correspondingly, hinge 10 of the top pair has leaf 11 affixed to the adjacent door section 2 and leaf 12 extending toward section 3. Hinge 13 of the bottom pair has leaf 14 affixed to section 2 and leaf 15 extending toward section 3.

Leaves 12 and 15 of hinges 10 and 13, respectively, are longer than leaves 6 and 9 of hinges 4 and 7, respectively.

Leaves 6 and 12, in cooperation with leaves 9 and 15, support a threaded rod 16 in a substantially upright position. Near the top of the rod 16, leaves 6 and 12 form a hinge in which the rod constitutes the pin. Similarly, near the bottom of the rod 16, leaves 9 and 15 form a hinge with the rod. Leaves 6 and 9 pivot about rod 16 while leaves 12 and 15 are rigidly affixed thereto.

A conventional rear view mirror 17 is supported by the rod 16 which fits through lugs 18 and 19 attached to the mirror frame. Spring washers (not shown) in combination with lock nuts 20, 21, 22 and 23 determine the vertical position of the mirror upon the rod 16. The lock nuts also rigidly secure the mirror 17 to the rod 16 to prevent it from pivoting when the door is opened or closed.

Figure 3:
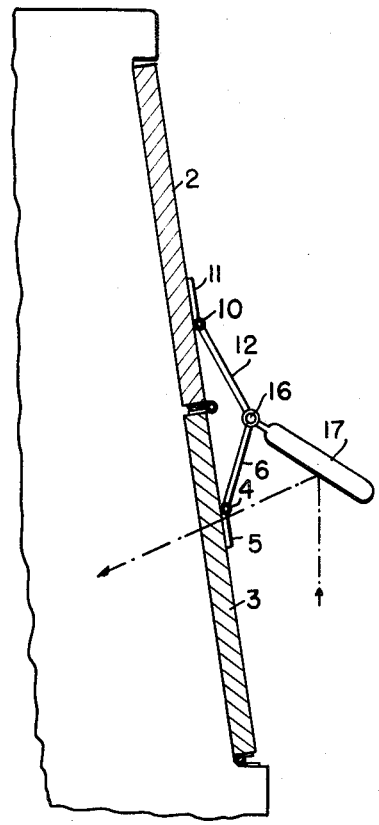
Figure 3 is a plan view showing the position of my bracket with a mirror attached thereto when the vehicle door is closed; and, Figure 4 is a plan view showing the position of my bracket mounting with the vehicle door open.

As shown in Figure 3, when the door is closed, top leaves 6 and 12 and bottom leaves 9 and 15 (not shown in Figure 3) project outwardly from door sections 2 and 3, thereby positioning the mirror so that the operator may view the right side of his vehicle. The closing of the door automatically brings the mirror to the position shown in Figure 3. The lock nuts 20, 21, 22 and 23 permit each operator to adjust the mirror to his convenience.

Figure 4:
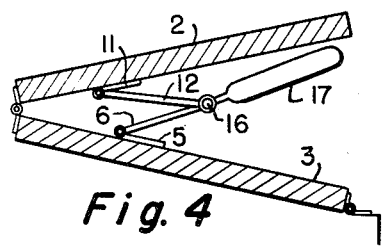

The leaves 6, 12, 9 and 15 completely withdraw the mirror in between the sections 2 and 3 of the door when it is opened (see Figure 4).

It is apparent that my invention has two important advantages. First, it substantially or completely withdraws the mirror in between the door sections when the door is open, thus materially reducing the likelihood of a pedestrian or passenger bumping into the mirror and suffering an injury. Second, my mounting automatically positions the mirror for viewing the right hand side of a vehicle each time the door is closed.

While a certain present preferred embodiment of the invention has been shown and described, it will be understood that it may be otherwise embodied within the scope of the appended claims.

I claim:

1. In combination with a multiple section folding type door for a vehicle, a mirror mounting for said door comprising spaced pivotal supports mounted on adjacent sections of said door, an arm mounted to pivot on each of said supports, said arms extending toward each other and being pivotally connected with respect to each other, one of said arms adapted to mount a mirror thereon so that when said door is closed the sections on which said supports are mounted move swingably away from each other and the mirror is projected outwardly from the door, and when said door is opened, the said sections move toward each other and the mirror is substantially withdrawn in between the sections of the door.

2. In combination with a multiple section folding type door for a vehicle, a mirror mounting for said door comprising spaced pivotal supports mounted on adjacent sections of said door, an arm mounted to pivot on a stationary axis on each of said supports, said arms extending toward each other and being pivotally connected with respect to each other, one of said arms for mounting a mirror thereon so that when said door is closed the sections on which said supports are mounted move swingably away from each other and the mirror is projected outwardly from the door, and when said door is opened, the said sections move toward each other and the mirror is substantially withdrawn in between the sections of the door.

3. In combination with a multiple section folding type door for a vehicle, a mirror mounting for said door comprising a pair of pivotal supports, each having an arm, one of said pivotal supports being affixed to one section of said door, the other pivotal support being affixed to an adjacent section of said door, said arms of the pivotal supports extending toward each other, a substantially vertically disposed rod for mounting a mirror thereupon being rigidly affixed to one of said arms, the other of said arms being pivotally connected to said rod, whereby when said door is closed, a mirror mounted upon said mounting is projected outwardly from said door, and whereby when said door is opened, said mirror is substantially withdrawn in between the two sections of said door.

4. In combination with a multiple section folding type door for a vehicle, a mirror mounting for said door comprising a pair of pivotal supports, each having an arm, one of said arms being longer than the other, one of said pivotal supports being affixed to one section of said door, the other pivotal support being affixed to an adjacent section of said door, said arms of the pivotal supports extending toward each other, a substantially vertically disposed rod for mounting a mirror thereupon being rigidly affixed to one of said arms, the other of said arms being pivotally connected with respect to said arm to which is affixed said rod, whereby when said door is closed, a mirror mounted upon said mounting is projected outwardly from said door, and whereby when said door is opened, said mirror is substantially withdrawn in between the two sections of said door.

5. A mirror mounting for a vehicle door of the multiple section folding type comprising a top pair and a bottom pair of hinges, each of said pair of hinges having one hinge with one of its leaves affixed to one section of the vehicle door and having the other hinge with one of its leaves affixed to an adjacent section of the vehicle door, the other leaves of said top pair of hinges extending towards each other and the other leaves of said bottom pair of hinges extending towards each other, said extending leaves supporting a substantially vertically disposed rod adapted for mounting a mirror thereupon, and projecting outwardly from said door when said door is closed, one top extending leaf and one bottom extending leaf each fastened to the same section of said door being longer than the other two extending leaves, one top extending leaf and one bottom extending leaf each fastened to the same section of said door being pivotally connected to said rod whereby when said door is closed said mirror is projected outwardly from said door and whereby when said door is opened said mirror is substantially withdrawn in between the two sections of said door.

References Cited in the file of this patent

UNITED STATES PATENTS

| 742,687 | Livingston | Oct. 27, 1903 |
| 1,823,636 | Winkle et al. | Sept. 15, 1931 |
| 2,552,074 | Thompson | May 8, 1951 |
| 2,708,086 | Prutzman | May 10, 1955 |